United States Patent
Brunner et al.

(10) Patent No.: US 9,541,393 B2
(45) Date of Patent: Jan. 10, 2017

(54) REDUCING POWER CONSUMPTION OR ERROR OF DIGITAL COMPASS

(75) Inventors: Christopher Brunner, San Diego, CA (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 13/174,313

(22) Filed: Jun. 30, 2011

(65) Prior Publication Data

US 2013/0006573 A1    Jan. 3, 2013

(51) Int. Cl.
| | |
|---|---|
| G01C 21/20 | (2006.01) |
| G01C 17/38 | (2006.01) |
| G06F 3/0346 | (2013.01) |
| G06F 1/32 | (2006.01) |
| G06F 3/038 | (2013.01) |
| G06F 1/16 | (2006.01) |

(52) U.S. Cl.
CPC .............. *G01C 17/38* (2013.01); *G01C 21/20* (2013.01); *G06F 1/1694* (2013.01); *G06F 1/325* (2013.01); *G06F 3/038* (2013.01); *G06F 3/0346* (2013.01)

(58) Field of Classification Search
CPC ............................... G01C 17/38; G06F 3/0346
USPC ........................................................ 702/141
See application file for complete search history.

(56) References Cited

U.S. PATENT DOCUMENTS

| | | | |
|---|---|---|---|
| 5,425,001 A * | 6/1995 | Polvani | G01V 3/15 114/21.3 |
| 5,761,094 A | 6/1998 | Olson et al. | |
| 6,401,047 B1 | 6/2002 | Voto et al. | |
| 6,577,976 B1 | 6/2003 | Hoff et al. | |
| 6,877,237 B1 | 4/2005 | Withanawasam | |
| 7,119,533 B2 | 10/2006 | Tamura et al. | |
| 7,210,236 B2 | 5/2007 | Sato et al | |
| 7,216,055 B1 | 5/2007 | Horton et al. | |
| 7,602,855 B2 | 10/2009 | Koo et al. | |
| 7,613,581 B2 | 11/2009 | Skvortsov et al. | |
| 7,711,762 B2 | 5/2010 | Howard et al. | |
| 7,826,999 B1 | 11/2010 | Boeen et al. | |
| 7,881,247 B2 | 2/2011 | Pan et al. | |
| 7,895,254 B2 | 2/2011 | Ketchum et al. | |
| 7,930,148 B1 | 4/2011 | Figaro et al. | |
| 7,937,217 B2 | 5/2011 | Okeya | |
| 8,044,841 B1 | 10/2011 | Boardman et al. | |
| 2002/0083605 A1 | 7/2002 | Blank et al. | |

(Continued)

FOREIGN PATENT DOCUMENTS

| | | |
|---|---|---|
| CN | 1957227 A | 5/2007 |
| EP | 0756179 A2 | 1/1997 |

(Continued)

OTHER PUBLICATIONS

STMicroelectronics, "LSM303DLH Data sheet", STMicroelectronics, Dec. 2009—http://www.mouser.com/ds/2/389/stmicroelectronics_cd00260288-331569.pdf.*

(Continued)

*Primary Examiner* — Regis Betsch
(74) *Attorney, Agent, or Firm* — Muncy, Geissler, Olds & Lowe, P.C.

(57) ABSTRACT

Example methods, apparatuses, or articles of manufacture are disclosed herein that may be utilized, in whole or in part, to facilitate or support one or more operations or techniques for reducing power consumption or error of a digital compass.

19 Claims, 4 Drawing Sheets

(56) References Cited

U.S. PATENT DOCUMENTS

| | | | |
|---|---|---|---|
| 2003/0140510 | A1 | 7/2003 | Woods et al. |
| 2005/0091861 | A1 | 5/2005 | Parks et al. |
| 2005/0253806 | A1 | 11/2005 | Liberty et al. |
| 2007/0055468 | A1 | 3/2007 | Pylvanainen |
| 2008/0042973 | A1* | 2/2008 | Zhao ............... G01C 17/30 345/156 |
| 2008/0051987 | A1 | 2/2008 | Okeya |
| 2008/0071492 | A1* | 3/2008 | Skvortsov et al. ............ 702/92 |
| 2008/0103655 | A1 | 5/2008 | Turnbull et al. |
| 2008/0317156 | A1 | 12/2008 | Sivanesan et al. |
| 2009/0167295 | A1 | 7/2009 | Chen et al. |
| 2009/0222204 | A1* | 9/2009 | Roberts ............... G05D 1/0259 701/470 |
| 2009/0303204 | A1* | 12/2009 | Nasiri et al. .................. 345/184 |
| 2009/0320305 | A1 | 12/2009 | Ito et al. |
| 2010/0033424 | A1 | 2/2010 | Kabasawa et al. |
| 2010/0121599 | A1 | 5/2010 | Boeve et al. |
| 2010/0312513 | A1* | 12/2010 | Mayor et al. ................. 702/104 |
| 2011/0106474 | A1 | 5/2011 | Kulik et al. |
| 2011/0106477 | A1 | 5/2011 | Brunner |
| 2011/0239026 | A1* | 9/2011 | Kulik ............... G01C 19/00 713/324 |

FOREIGN PATENT DOCUMENTS

| | | |
|---|---|---|
| EP | 1903305 A2 | 3/2008 |
| EP | 2009393 A1 | 12/2008 |
| EP | 2249124 A1 | 11/2010 |
| JP | H08136260 A | 5/1996 |
| JP | 8313261 A | 11/1996 |
| JP | 2004309227 A | 11/2004 |
| JP | 2005291934 A | 10/2005 |
| JP | 2005315650 A | 11/2005 |
| JP | 2006005540 A | 1/2006 |
| JP | 2006153674 A | 6/2006 |
| JP | 2007524805 A | 8/2007 |
| JP | 2007256161 A | 10/2007 |
| JP | 2007271454 A | 10/2007 |
| JP | 2008076397 A | 4/2008 |
| KR | 20060133078 A | 12/2006 |
| KR | 20080107479 A | 12/2008 |
| KR | 20100030613 A | 3/2010 |
| TW | 200610974 A | 4/2006 |
| TW | 200905165 A | 2/2009 |
| TW | 200907300 A | 2/2009 |
| WO | 2004076971 A2 | 9/2004 |
| WO | WO2007026238 A1 | 3/2007 |
| WO | 2007114236 A1 | 10/2007 |
| WO | 2009068116 A1 | 6/2009 |
| WO | 2011056875 A1 | 5/2011 |

OTHER PUBLICATIONS

Foster C C, et al., "Extension of a Two-Step Calibration Methodology to Include Nonorthogonal Sensor Axes", IEEE Transactions on Aerospace and Electronic Systems, IEEE Service Center, Piscataway, NJ, US, vol. 44, No. 3, Jul. 1, 2008 (Jul. 1, 2008), pp. 1070-1078, XP011236647.

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.

Brown, A., "The derivation of the velocity ellipsoid from proper motions", 1941, Monthly Notices of the Royal Astronomical Society, vol. 101, p. 284, http://adsabs.harvard.edugul1/1941MNRAS.101..284B.

Camps, F., "Numerical calibration for 3-axis accelerometers and magnetometers", Issue Date: Jun. 7-9, 2009, '09. IEEE International Conference on Electro/Information Technology, 2009, pp. 217-221.

International Search Report and Written Opinion—PCT/US2012/044024—ISA/EPO—Oct. 8, 2012.

* cited by examiner

REDUCING POWER CONSUMPTION OR ERROR OF DIGITAL COMPASS

BACKGROUND

1. Field

The present disclosure relates generally to processing of sensor information for use with mobile communication devices and, more particularly, to reducing power consumption or error of a digital compass for use in or with mobile communication devices.

2. Information

Mobile communication devices, for example, cellular telephones, portable navigation units, laptop computers, personal digital assistants, or the like play an important role in allowing society to maintain its mobility. For example, mobile communication devices may enable users to request or access information, services, etc. anytime anyplace via one or more applications hosted on computing platforms associated with these devices. Such applications may include, for example, navigation or position-tracking applications, geo-processing or mapping applications, Web-browsing applications, game or music-related applications, or the like.

To support a number of applications in today's market, mobile communication devices may employ a variety of sensors. These sensors may typically, although not necessarily, be capable of converting physical phenomena into analog or digital signals and may be integrated into (e.g., built-in, etc.) or otherwise supported by (e.g., stand-alone, etc.) a mobile communication device. For example, a mobile communication device may feature one or more accelerometers, gyroscopes, magnetometers, gravitometers, ambient light detectors, proximity sensors, thermometers, etc., capable of measuring various motion states, locations, orientations, ambient environments, etc. of the mobile device. Sensors may be utilized individually or may be used in combination with other sensors, depending on a particular application.

Obtaining or providing more accurate or useful sensor measurements for use by applications hosted on a mobile communication device may, for example, improve or enhance performance of such applications. Accordingly, from time to time, it may be desirable to calibrate one or more associated sensors in some manner.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1A:
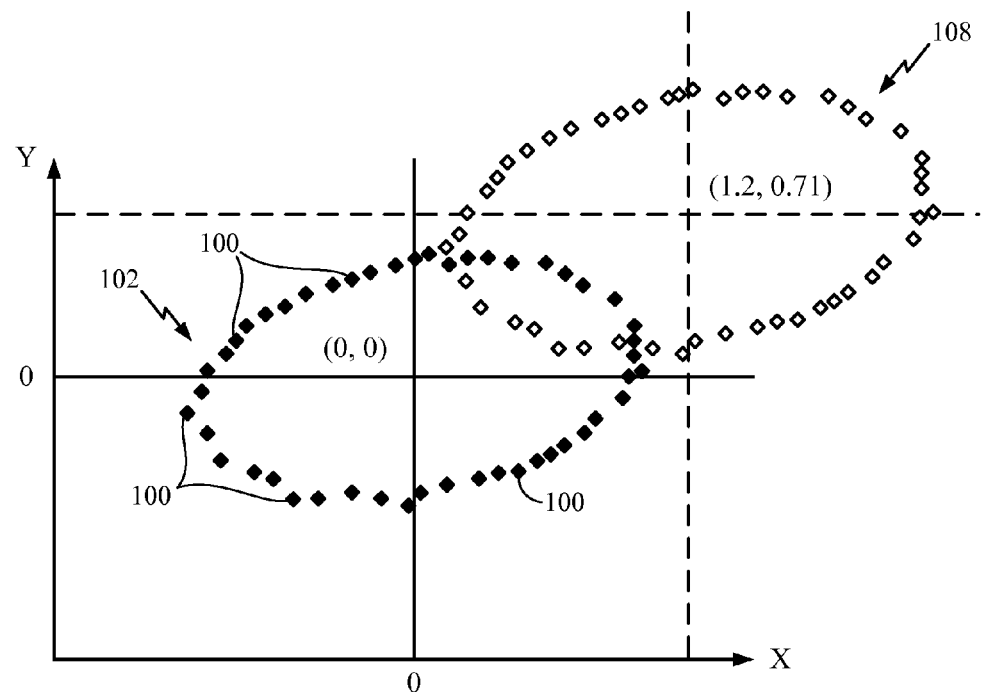
FIGS. 1A and 1B are schematic diagrams of example plotted magnetometer output signals according to an implementation.

Example implementations relate to reducing power consumption or error of a digital compass. In one implementation, a method may comprise suspending, at a mobile device, a process to calibrate a magnetometer in response to a determination that the mobile device is in a stationary state. In one particular implementation, a method may further comprise detecting an interval of motion of the mobile device; and suspending calibration of the magnetometer before and after such an interval.

In another implementation, a method may comprise detecting, at a mobile device, at least one condition; and changing a rate at which a process of calibrating a magnetometer is to be executed based, at least in part, on the detected at least one condition.

In yet another implementation, an apparatus may comprise means for detecting at least one condition; and means for changing a rate at which a process of calibrating a magnetometer is to be executed based, at least in part, on the detected at least one condition.

In yet another implementation, an apparatus may comprise a mobile device comprising a magnetometer and at least one processor to suspend a process to calibrate the magnetometer in response to a determination that the mobile device is in a stationary state.

In yet another implementation, an article may comprise a storage medium having instructions stored thereon executable by a special purpose computing platform to suspend, at a mobile device, a process to calibrate a magnetometer in response to a determination that the mobile device is in a stationary state. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for reducing power consumption or error of a digital compass. As will be described in greater detail below, a digital compass may be associated, for example, with a mobile communication device and may be utilized, at least in part, to help or assist a user with indoor or outdoor navigation, to obtain or provide measurement signals for use by a variety of host applications, such as position-tracking applications, gaming applications, or the like. As used herein, "mobile device," "mobile communication device," "wireless device," "hand-held device," or the plural form of such terms may be used interchangeably and may refer to any kind of special purpose computing platform or device that may from time to time have a position, location, or orientation that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized to facilitate one or more processes or operations in connection with reducing power consumption or error of an associated digital compass, and that claimed subject matter is not limited in this regard.

As previously mentioned, typically, although not necessarily, a digital compass may obtain or receive signals representative of various measurements from one or more sensors integrated into or otherwise supported by a mobile device. These measurement signals may be processed in some manner so as to detect or determine, for example, various motion states, orientations, locations, etc. of a mobile device. For example, a digital compass may obtain or receive measurement signals from one or more on-board accelerometers, magnetometers, gyroscopes, or the like responsive to a level of acceleration vibration, strength or direction of a magnetic field, tilt or orientation, etc. experienced by a mobile device. The above sensors, as well as other possible sensors not listed, may be utilized individually or may be used in combination with other sensors, depending on a particular application, as was also indicated. For example, in pedestrian navigation applications, a mobile device may feature a digital compass utilizing both a magnetometer to measure a magnetic field and an accelerometer for tilt compensation, just to illustrate one possible implementation. Here, since a pedestrian user typically, although not necessarily, navigates or moves relatively slowly (e.g., walks, etc.), a digital compass may provide more accurate heading or orientation information compared, for example, to global positioning system (GPS)-supported heading measurements computed from consecutive position estimates. Of course, details relating to various sensors that obtain or provide measurement signals to a digital compass are merely examples, and claimed subject matter is not limited in this regard.

Following the above discussion, a digital compass associated with a mobile device may, for example, receive or obtain measurement signals from one or more on-board inertial sensors, such as an accelerometer, a magnetometer, a gyroscope, or the like. An accelerometer, for example, may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. A direction of gravity may be measured in relation to any suitable frame of reference, for example, in a coordinate system in which the origin or initial point of gravity vectors is fixed to or moves with a mobile device. A gyroscope may utilize the Coriolis effect and may provide angular rate measurements in roll, pitch, or yaw dimensions and may be used, at least in part, in applications determining heading or azimuth changes, as one possible example. A magnetometer may, for example, measure the direction of a magnetic field in X, Y, Z dimensions and may be used, at least in part, in sensing true North or absolute heading in various navigation applications. It should be noted that these are merely examples of sensors that may be used, in whole or in part, to determine various states of a mobile device in connection with one or more operations or techniques for reducing power consumption or error of an associated digital compass, and that claimed subject matter is not limited in this regard.

For example, as will be described in greater detail below, one or more sensors mentioned above as well as other possible sensors not listed may provide measurement signals that may be used, at least in part, to detect or infer motion of a mobile device. As used herein, a "motion" may refer to a physical displacement of an object, such as a mobile device, for example, relative to some frame of reference. As a way of illustration, a physical displacement may include, for example, changes in terms of an object's velocity, acceleration, position, orientation, or the like. Based, at least in part, on detected motion, a mobile device may, for example, determine whether to initiate or perform one or more calibration operations with respect to one or more associated sensors or whether a calibration operation may be suspended or otherwise postponed. In addition, in one particular implementation, based, at least in part, on detected motion, a mobile device may, for example, adjust or otherwise change in some manner a sensor calibration rate or a rate at which sample measurements are collected, as will also be seen. This may facilitate or support, for example, better power management, eliminate or reduce performance errors, enhance usefulness of sensor measurements, etc. of a digital compass or associated mobile device, as previously mentioned. Of course, details related to various implementations are merely examples, and claimed subject matter is not so limited.

As was indicated, calibrating one or more associated sensors may, for example, enhance, improve, or otherwise affect performance of various applications hosted on a mobile device. Host applications may comprise, for example, pedestrian navigation applications, three-dimensional (3D) point-and-click games, or the like, which may rely, at least in part, on measurement signals obtained or received from a digital compass, just to illustrate one possible implementation. Here, a digital compass may request or obtain one or more measurement signals representative, for example, of a heading, orientation, acceleration, rotation, etc. of a mobile device from one or more associated sensors. In one particular implementation, these sensors may comprise, for example, a 3D magnetometer to measure the Earth's magnetic field and a 3D accelerometer for tilt compensation, as previously mentioned. Claimed subject matter is not intended to be so limited, of course. For example, in certain implementations, in addition to or instead of an accelerometer or magnetometer, a gyroscope may also be utilized. The utilization of a gyroscope, however, may introduce a substantial or undesirable angular drift or bias, which may need to be augmented or compensated using, for example, measurement signals from other associated sensors, which may lead to increased complexity, power consumption, cost, or the like.

Continuing with the above example, to facilitate or support obtaining or providing more accurate or useful sensor measurement information to a digital compass, for example, it may be desirable from time to time to calibrate one or more associated sensors. Thus, in an implementation, a mobile device may feature a functionality to calibrate, for example, a magnetometer, accelerometer, or any other associated sensor(s), which may provide measurement signals to a digital compass, tilt-compensated or otherwise. It should be appreciated that any suitable or desired calibration method or technique may be utilized, and that claimed subject matter is not limited to one particular method or technique. For example, an accelerometer may be calibrated, at least in part, using sample measurements obtained while an associated mobile device is in a relatively stable or stationary state, such as while an accelerometer's variance is relatively low or when a norm of an acceleration input vector is relatively constant. Typically, although not necessarily, accelerometer calibration may be performed less frequently than calibration of a magnetometer, however, since an accelerometer is generally not affected by magnetic disturbances or anomalies due to a presence of ferromagnetic objects (e.g., steel, metal, etc.) in the vicinity of the sensor. In addition, since an accelerometer or, for example, a gyroscope may typically, although not necessarily, go out of calibration mainly due to temperature changes in or around the sensors, suitable look-up tables with temperature-dependent calibration parameters or like information may be gradually built. These temperature tables may be subsequently utilized so as to help to perform or maintain respective sensor calibrations with relative ease or predictability, for example, performing calibration if or when a temperature changes. Of course, sensor calibration details are merely examples, and claimed subject matter is not limited in this regard. Accelerometer or gyroscope calibration techniques are known and need not be described here in greater detail.

In contrast, in some instances, performing or maintaining accurate or otherwise suitable calibration of a magnetometer, however, may be a challenging, less predictable, or otherwise continuous task since magnetic environment in or around the sensor may change substantially in a short amount of time, for example, due to various external or internal factors. Here, internal factors may include, for example, a presence of ferromagnetic objects embodied in a mechanical structure of a mobile device, such as various hinges, swivels, sliding rails, keypads, etc. that change location or position relative to a magnetometer, as previously mentioned. To illustrate, a mobile device may be implemented, for example, as a flip or clamshell-style cell phone having ferromagnetic segments (e.g., hinges, keypads, etc.) that move relative to a sensor when the phone is flipped from a closed to an open position or vice versa, thus, changing a magnetic field. Likewise, a slider-style cell phone may comprise a number of movable mechanical structures incorporating ferromagnetic materials, such as two or more sections that slide past each other on rails, thus, affecting a magnetic field in some manner, as another possible example. Of course, details relating to various internal factors are provided herein as merely examples, and claimed subject matter is not so limited.

Continuing with the above discussion, external factors may comprise, for example, a presence of ferromagnetic objects external to a mobile device, such as a set of metal keys placed next to an associated magnetometer (e.g., in a pocket, etc.), metal segments or structures incorporated into desks, chairs, buildings, walls, vehicle frames, etc. in the vicinity of the sensor. Likewise, here, a magnetic field may change relatively quickly when a user places a mobile device next to a set of keys in a pocket, for example, or walks from a sidewalk along high-rising buildings with metal facades onto a sidewalk along a park. In addition, temperature changes in or around a magnetometer may also contribute in some manner to various magnetic field reading distortions. Of course, details relating to various internal factors are merely examples, and claimed subject matter is not limited in this regard.

Thus, a magnetic field(s) resulting from internal or external factors may overlap, superimpose on, or otherwise interfere in some manner with the Earth's magnetic field and may create or cause magnetic anomalies, for example, leading to magnetic field reading distortions. In turn, this may lead, for example, to inaccurate magnetometer calibration, if performed, by introducing biased values, contribute to heading errors, prevent timely sensor calibration, or the like, as previously mentioned. Again, it should be appreciated that any suitable or desired magnetometer calibration techniques or methods may be utilized, and that claimed subject matter is not limited to one particular method or technique. For example, a magnetometer may be calibrated, at least in part, via an ellipse/ellipsoid fitting-type process, just to illustrate one possible implementation. Here, an ellipse/ellipsoid fitting-type process may be applied, for example, by means of an iterative algorithm or procedure tracking changes in calibration parameters using filter-stored magnetometer samples. In other implementations, a batch processing-type algorithm or procedure employing, for example, buffers-stored magnetometer samples may also be utilized. Again, magnetometer calibration techniques are known and need not be described here in greater detail.

In certain simulations or experiments, it has been observed that while a mobile device is in a stationary state or at rest, there may be an insubstantial benefit from calibrating an associated magnetometer. For example, magnetometer calibration may typically, although not necessarily, involve moving or rotating a mobile device in a relatively uniform magnetic field such that a number of magnetometer measurements or samples are generated or obtained while the mobile device is at different orientations. Based, at least in part, on obtained or generated samples, a plotted output of an uncalibrated magnetometer may be represented, for example, by a number of points on an ellipse instead of a circle, in case of a 2D magnetometer, or an ellipsoid instead of a sphere, in case of a 3D magnetometer.

Figure 1B:
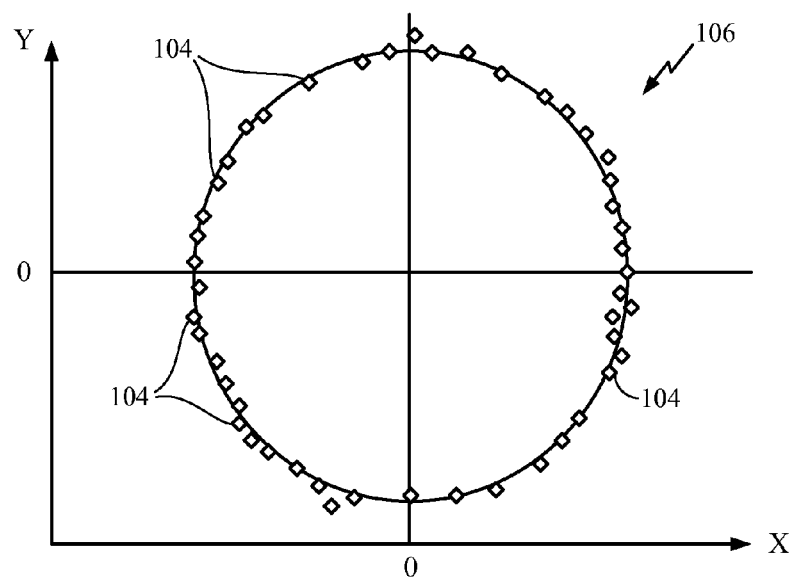

As a way of illustration, FIGS. 1A and 1B are schematic diagrams of example plotted output signals of an uncalibrated and calibrated 2D magnetometer, respectively, according to an implementation. As seen, magnetometer samples captured or obtained via moving or rotating a magnetometer may be represented, for example, by a number of points, such as points 100 forming an ellipse 102 in FIG. 1A or points 104 forming a circle 106 in FIG. 1B. In this illustrated example, ellipse 102 shown in FIG. 1A may be a result of various internal or external factors, for example, affecting a magnetic field in the vicinity of the sensor, as previously mentioned. As was also indicated, while there is no or little interference from a magnetic field surrounding a magnetometer, for example, or if the magnetometer is sufficiently calibrated, magnetometer samples may form a circle centered in the origin (0,0), such as circle 106 in FIG. 1B. In some instances, ellipse 102 or an ellipsoid, in case of a 3D magnetometer, for example, may be offset in some manner from the origin of a coordinate system. By way of example but not limitation, a plotted output of an uncalibrated magnetometer that is offset from the origin of a coordinate system (e.g., (1.2, 0.71), etc.) may include one referenced generally by an arrow at 108. Of course, such descriptions of plotted outputs of a calibrated or uncalibrated magnetometer are merely examples, and claimed subject matter is not so limited.

Continuing with the above discussion, it has been observed that while a mobile device is stationary, no new or otherwise updated points on an ellipse/ellipsoid may be typically generated or obtained, meaning that sample measurements may be repetitive in nature or otherwise descriptive of the same or similarly located points. Thus, it appears that magnetometer samples that change little or remain relatively unchanged may, for example, provide little or no information with respect to parameter estimation, tracking, selection, etc. for purposes of calibration. Accordingly, in an implementation, magnetometer calibration may be suspended or otherwise postponed if it is determined, for example, that a mobile device is in a stationary state or at rest. Since magnetometers may draw or consume considerable amount of power, suspending or postponing magnetometer calibration may prove beneficial in terms of extending a battery life of a digital compass or associated mobile device, as previously mentioned.

Furthermore, in certain simulations or experiments, it also appeared that in at least some instances, a magnetometer is more likely to be in an environment affected by magnetic anomalies while an associated mobile device is in a stationary state. For example, it has been observed that a stationary mobile device is more likely to rest on a table or desk that may have a number of ferromagnetic objects, embodied or proximate, such as fasteners, reinforcing plates, hinges, lamps, computers, keys, or the like. In some instances, a mobile device may also be held by a stationary user leaning towards or being in a sufficiently close proximity to a wall with metal inclusions, such as bars, electric wires, nails, etc. In addition, at times, a user may hold a mobile device in a stationary position, such as in a relatively steady hand to allow reading a message on a display, for example, while sitting in a metal-reinforced chair or being on board of a steel-framed vehicle (e.g., on a bus, etc.), as another possible illustration. Here, a magnetometer may go out of calibration relatively quickly due to various ferromagnetic objects causing or creating magnetic anomalies in the vicinity of the sensor, as previously mentioned. In such an environment, performing magnetometer calibration may be less useful or, at times, somewhat harmful. For example, magnetic anomalies may cause a magnetic model mismatch by introducing errors via biased, noisy, or otherwise undesired measurement signals, which may lead to decreased performance of a mobile device in general or a digital compass in particular. Likewise, here, it may be beneficial to suspend or otherwise postpone magnetometer calibration if it is determined, for example, that an associated mobile device in a stationary state or at rest. As previously mentioned, this may improve or enhance performance of various host applications, such as applications utilizing a digital compass, for example, or may decrease calibration error rates, or the like.

As indicated above, a stationary state of a mobile device may be detected or inferred using measurements from one or more associated inertial sensors, such as an accelerometer, magnetometer, gyroscope, or the like using known techniques. Thus, in an implementation, an accelerometer, such as, for example, a 3D accelerometer may be utilized, at least in part, to detect or infer motion of a mobile device. For example, here, a 3D accelerometer may detect or infer motion by measuring acceleration with reference to X, Y, and Z axes or dimensions in a Cartesian coordinate system as well as rotation in roll ($\phi$) or pitch ($\tau$) dimensions, thus, providing five degrees of observability (X, Y, Z, $\phi$, $\tau$). For this example, phi ($\phi$) represents roll or rotation about an X axis and tau ($\tau$) represents pitch or rotation about a Y axis. Claimed subject matter is not so limited to using an accelerometer, of course. In one particular implementation, a gyroscope may also be utilized to detect motion, for example, measured in terms of rotational coordinates ($\phi$, $\tau$, $\psi$), wherein ($\phi$) and ($\tau$) represent roll and pitch, respectively, and psi ($\psi$) represent yaw or rotation about a Z axis. Again, various motion detection techniques using, for example, an accelerometer or gyroscope are known and need not be described here in greater detail.

Optionally or alternatively, motion of a mobile device may be detected or inferred, at least in part, using measurement signals of a magnetometer sampled in connection, for example, with estimating a heading variance, though claimed subject matter is not so limited. For example, in an implementation, an estimated variance of magnetometer samples may be compared in some manner against some pre-defined threshold, and if the variance exceeds such a threshold, a motion may be declared. Otherwise, if an estimated variance is below a certain pre-defined threshold, it may be inferred that a mobile device is stationary or at rest. By way of example but not limitation, if a sliding window used in connection with estimating variance comprises magnetometer samples that are relatively unchanged or otherwise change little, a stationary state may be declared.

It should be understood, however, that these are merely examples of sensors or techniques that may be used to detect or infer motion with reference to an example coordinate system, such as a Cartesian coordinate system, for example, and that claimed subject matter is not limited to these particular sensors, techniques, or coordinate system. For example, in certain implementations, a non-Cartesian coordinate system or a coordinate system defining dimensions that are mutually orthogonal may also be used.

In addition to an observation that a stationary mobile device is more likely to be affected by ferromagnetic objects, it has also been observed that during some time interval before or after a mobile device is stationary, it may also be affected by these objects. For example, in some instances, it appeared that immediately before or after a stationary state there is a higher probability that a mobile device may still be in a sufficiently close proximity to the same ferromagnetic objects so as to be possibly affected by magnetic anomalies. Accordingly, in an implementation, magnetometer calibration may be suspended or otherwise postponed during, for example, some time interval of detected or inferred motion before or after a mobile device is stationary. It should be appreciated that such an approach may be implemented as appropriate, meaning that a particular time interval may vary depending, at least in part, on a host application, magnetic environment, mechanical structure of a mobile device, or the like, so as not to be performed in a continual or otherwise similar fashion, for example. By way of example but not limitation, in certain simulations or experiments, a time interval in a range of 0.04 to 1 second was used. Here, it appeared that suspending or otherwise postponing magnetometer calibration in a range of 0.04 to 1 second before or after a mobile device is stationary may, for example, eliminate or reduce a magnetic model mismatch, calibration errors, improve power consumption, or the like. Of course, details relating to various observations or a time interval are merely examples, and claimed subject matter is not limited in these respects. In this illustrated example, motion of a mobile device may be detected or inferred using known techniques, such as, for example, one or more techniques mentioned above.

As previously mentioned, a mobile device may calibrate an associated magnetometer periodically or at a certain rate. For example, magnetometer calibration rate may correspond, at least in part, to a rate at which suitable magnetometer samples are collected (e.g., for set selection, parameter tracking, etc.), just to illustrate one possible implementation. In certain implementations, a magnetometer calibration rate may, for example, be adjusted or varied in some manner based, at least in part, on one or more detected conditions of an associated mobile device. As a way of illustration, in one particular implementation, a magnetometer calibration rate may be adjusted or varied based, at least in part, on a detected turn rate or rate of change in orientation of a mobile device, though claimed subject matter is not so limited. For example, if a mobile device is being turned relatively slowly, such as while a user of the device is walking or driving relatively steadily, magnetometer calibration may be initiated or performed periodically or at a slower rate. On the other hand, if a mobile device is being turned relatively quickly, such as while a user is walking relatively fast or running, for example, an associated magnetometer may be calibrated at a relatively higher rate. A magnetometer calibration rate may be determined or derived, at least in part, experimentally and pre-defined, for example, or otherwise dynamically defined in some manner. Here, changes in rotation or orientation of a mobile device may, for example, be detected, at least in part, by a gyroscope or, potentially, an accelerometer performing respective measurement activities. Of course, claimed subject matter is not so limited.

In certain implementations, a magnetometer calibration rate may be determined or derived, at least in part, from a variation in suitable measurements of a magnetometer sampled in connection, for example, with a calibration parameter tracking, set selection, or the like. If such a variation is relatively low, suggesting that newly captured or obtained points on an ellipse/ellipsoid are not distinctly or otherwise sufficiently different from previously captured or obtained points due to a slower rotation, for example, then magnetometer calibration may be suspended or otherwise postponed. In other words, since the same or similarly situated points on an ellipse/ellipsoid are less informative or useful with respect to calibration, as observed above, it may be beneficial to suspend or postpone a process to calibrate a magnetometer until or unless sufficiently distinct or different points are captured or obtained. By way of example but not limitation, in certain simulations or experiments, it appeared that transitioning from one point on an ellipse/ellipsoid to another point within a time interval in a range of a half of a second to one second may correspond to a slower rotation of a mobile device so as to suspend or postpone a process of calibration. Of course, details relating to determining a calibration rate from a variation in magnetometer measurements are merely examples, and claimed subject matter is not so limited.

In certain implementations, one or more magnetometer samples may, for example, be selected or stored in some manner for further transmission to a processing unit or some other component in a burst or otherwise concurrent fashion, as previously mentioned. This may help to achieve results that are more robust, for example, as it allows for a concurrent processing, applying a fewer number of iterations, reduced processing time, or the like. In some instances, a number of points on an ellipse/ellipsoid available or otherwise suitable for processing in connection with calibrating a magnetometer may be limited in some manner, such as by a memory size, algorithm type, or the like. Thus, in certain simulations or experiments, it appears that selecting or storing points distributed relatively uniformly on an ellipse/ellipsoid may prove beneficial for managing power of a mobile device in connection, for example, with magnetometer calibration. Thus, at times, it may be advantageous to select or store, for example, every other point on an ellipse/ellipsoid or otherwise points not situated or clustered next or in sufficiently close proximity to each other, though claimed subject matter is not so limited. Optionally or alternatively, it may be desirable to consider selecting or storing a certain number of points from distinctly or differently situated clusters of points on an ellipse/ellipsoid, as another possible example. In other words, here, a magnetometer calibration rate may be adjusted based, at least in part, on availability of points having useful or otherwise helpful (e.g., new, etc.) information for purposes of calibration, for example. This may eliminate or reduce instances of unnecessary or otherwise undesired magnetometer calibration initiated or performed in connection with processing points that are less informative or useful. As such, battery power that otherwise would be spent or consumed during such calibration may be saved, for example, thus, prolonging an operating life-time of a digital compass or mobile device. Of course, these are merely examples that may be used, at least in part, to determine or derive magnetometer calibration rates, and claimed subject matter is not so limited.

In an implementation, a rate at which a magnetometer is calibrated may be adjusted or varied in some manner based, at least in part, on a measure of fitness of one or more calibration parameters. For example, a process to calibrate a magnetometer may be suspended or otherwise postponed if it is determined that magnetometer calibration parameters fit well. In this context, calibration parameters may fit well if, for example, such parameters map an ellipse/ellipsoid defined by suitable magnetometer samples obtained at different orientations or rotations of the sensor to a centered unit circle/sphere, respectively. If this fit deteriorates due to a presence of near-by ferromagnetic objects, for example, then a magnetometer calibration rate may be increased. This may provide benefits in terms of more effective or efficient collection, storing, or application of magnetometer samples, for example, managing memory usage, or the like. For example, in an environment where a magnetic field changes from time to time or somewhat periodically, such as while a flip or clamshell-style cell phone opens or closes, it may be beneficial to delete or otherwise ignore magnetometer samples collected prior to such a change. In such a case, a magnetometer may, for example, be calibrated using newly-collected samples at a relatively higher rate. In an environment, in which a magnetic field is more prone to a continual change, such as, for example, while a user of a mobile device is walking next to various metal structures (e.g., buildings, fences, etc.), suitable samples, such as samples collected before the anomaly may be retained and may be applied at a later time. For this example, a calibration process may be postponed or otherwise sufficiently slowed down until it is determined that previously collected calibration parameters fit sufficiently well. Of course, these are merely examples, and claimed subject matter is not so limited.

It should be appreciated that any suitable or desired fit metric may be utilized, for example, to evaluate the accuracy of the fit. For example, as described below, in one particular implementation, a circle/sphere may have an expected radius of 1, meaning that the average length of calibrated samples is expected to correspond to a scalar or unit value of 1. Optionally or alternatively, a value of a radius may be modeled experimentally with reference to the local Earth magnetic field to which the sensor was exposed and may be defined in units of Gauss. Of course, such a description of a measure of fitness or its benefits is merely an example, and claimed subject matter is not limited in this regard.

More specifically, in one implementation, prior to initiating or performing a process to calibrate a magnetometer, ellipse/ellipsoid parameters may be estimated based, at least in part, on suitable sensor measurements obtained via sampling a magnetometer in some manner, such as, for example, in a manner described below. As was indicated, any suitable or desired ellipse/ellipsoid parameter estimation techniques may be utilized. For this example, a magnetometer may be sampled at some pre-defined rate that may be determined or defined, at least in part, by an applicable calibration algorithm or process, just to illustrate one possible implementation. By way of example but not limitation, in certain simulations or experiments, a sampling rate in a range of 1.0 Hz to 10.0 Hz was used, such that to allow, for example, for a timely processing of ellipse/ellipsoid parameters by capturing changes in a magnetic field without increasing or driving up processing requirements. Optionally or alternatively, suitable sensor measurements may, for example, be obtained by sampling a magnetometer in connection with one or more host applications requesting particular information from a digital compass, such as magnetic heading estimates, magnetic field intensity or direction readings, or the like. This may provide benefits in terms of obtaining suitable magnetometer measurements without performing a separate or additional sampling process (e.g., on-demand, etc.) and, as such, may prove more practical or economical in terms of power consumption of a digital compass or mobile device, for example. In some instances, a magnetometer may be sampled, at least in part, in connection with a user turning, rotating, or otherwise operating an associated mobile device in some manner (e.g., while walking, talking, playing games, etc.) that may be sufficient to obtain accurate or otherwise suitable magnetic estimates. Again, such a description of a sampling process or its benefits is merely an example, and claimed subject matter is not limited in this regard.

Continuing with the above discussion, having estimated ellipse/ellipsoid parameters, it may be determined, for example, whether such parameters fit well into existing calibration. As previously mentioned, a plotted output of a rotated multi-dimensional magnetometer, such as a 2D or 3D magnetometer, for example, may be represented by a number of signal points or samples forming or generating a circle/sphere or an ellipse/ellipsoid, respectively, depending on the state of calibration. For example, as particularly seen in FIG. 2, samples of a calibrated 3D magnetometer, indicated generally at 200, may form or generate a sphere 202 centered in the origin (0,0,0) or, in case of a 2D magnetometer, a circle 204 centered in the origin (0,0). As also illustrated, a plotted output of an uncalibrated magnetometer formed by magnetic samples, indicated generally at 206, may correspond to an ellipsoid 208 in 3D or an ellipse 210 in 2D, for example, that may be offset or displaced from the origin. An output of a magnetometer corresponding to such an ellipse/ellipsoid may be a result of several sources of error associated with various internal or external factors interfering with or otherwise affecting a magnetic field in the vicinity of the sensor, as indicated above. As is known, sources of error may include, for example, a DC offset or bias along one or more magnetometer axes, differing magnetic sensitivities in X, Y, or Z dimensions, misalignment due to non-orthogonality between individual sensors, or the like. Of course, claimed subject matter is not limited to these example plotted outputs, coordinate system, or sources of error.

Based, at least in part, on determined ellipse/ellipsoid parameters, one or more output errors or factors due to, for example, various magnetic interferences may be estimated using any suitable or desired techniques. By way of example, in one particular implementation, for a 3D magnetometer with ellipsoid parameters $$a = (ABCDEFGHKL)^T$$

an offset o from the origin, with —pinv denoting a pseudo-inverse, for example, may be estimated as:

$$o = -\text{pinv}\left(\begin{bmatrix} A & D & E \\ D & B & F \\ E & F & C \end{bmatrix}\right)\begin{pmatrix} G \\ H \\ K \end{pmatrix} \quad (1)$$

In turn, a sensitivity factor with respect to each of three axes of a 3D magnetometer may be estimated using, for example, the following relation:

$$B = -\left(L + 2o^H\begin{pmatrix} G \\ H \\ K \end{pmatrix} + o^H\begin{bmatrix} A & D & E \\ D & B & F \\ E & F & C \end{bmatrix}o\right)\text{pinv}\left(\begin{bmatrix} A & D & E \\ D & B & F \\ E & F & C \end{bmatrix}\right) \quad (2)$$

$$s = \sqrt{\text{diag}(B)}$$

where s denotes a sensitivity calibration factor and diag denotes the diagonal component of a matrix. As seen, an offset and sensitivity vectors both may have three entries corresponding to three axes of a 3D magnetometer.

Also, misalignment errors representative of a non-orthogonality factor for each axis of a 3D magnetometer may, for example, be defined as:

$$C = \text{diag}(s)^{-1} B \text{diag}(s)^{-1}$$

$$\vartheta = \frac{1}{2}C(1,2) \quad \theta = \frac{1}{2}C(1,3) \quad \varphi = \frac{1}{2}C(2,3)$$

where diag indicates that a vector is turned into a matrix of zeros except for the diagonal, $C(n,m)$ denotes the element of matrix C at row n and column m, and $\vartheta$, $\theta$, $\varphi$ are non-orthogonality angles in radians for planes X-Y, X-Z, and Y-Z, respectively.

It should be appreciated that above relations may be rearranged in some manner so as to be applicable to a 2D magnetometer by factoring in, for example, parameters that form an ellipse. Thus, consider $a=(A\ B\ C\ D\ E\ L)^T$. In such a case, offset or sensitivity vectors both may, for example, have two entries corresponding to two axes obtained from a linear combination of the three magnetometer outputs mapped to a plane (e.g., horizontal, etc.). Here, misalignment errors representative of a non-orthogonality between two axes may, for example, be captured by an angle $\vartheta$. It should also be noted that details relating to estimating output errors or factors are merely examples, and claimed subject matter is not limited in this regard.

Figure 2:
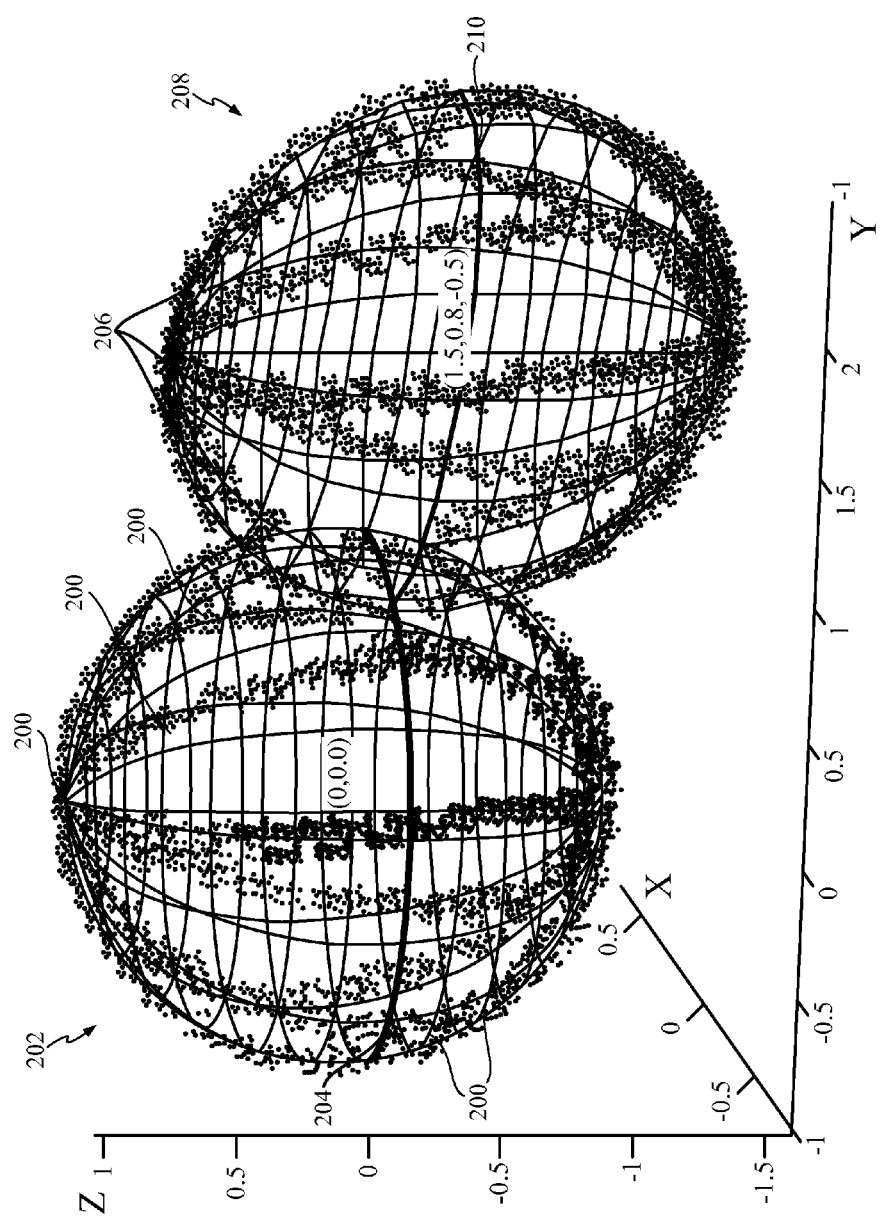
FIG. 2 is a schematic diagram further illustrating example plotted magnetometer output signals according to an implementation.

In an implementation, during calibration, a radius of a circle/sphere, such as circle 204 of FIG. 2, in case of 2D magnetometer, or sphere 202, in case of 3D magnetometer, for example, may be determined or estimated using suitable or desired techniques. In this context, the radius of a circle/sphere may be equal or correspond to a magnitude or length of a magnetic field vector. Thus, to determine the magnitude or length of a magnetic field vector, the respective equations of a circle/sphere centered at the origin with a radius of B may be used. Without loss of generality, then, the square of a magnitude of a magnetic field B may be equal to the sum of the square of multi-dimensional components representing magnetometer outputs along, for example, X, Y, or Z axes. In case of a 2D magnetometer, the radius $B_H$ of a circle equal to the magnitude of a horizontal component of magnetic field vector, for example, may typically be estimated using following relation:

$$B_H{}^2 = B_x{}^{b^2} + B_y{}^{b^2} \qquad (4)$$

For a 3D magnetometer, Relation (4) may be extended to account for the total of the magnetic field by factoring in, for example, magnetometer triads or X, Y, and Z sensors as:

$$B^2 = B_x{}^{b^2} + B_y{}^{b^2} + B_z{}^{b^2} \qquad (5)$$

As previously mentioned, to evaluate the accuracy of the fit, the radius of a circle/sphere may be pre-defined, for example, or otherwise dynamically defined in some manner so as to correspond to a calibrated magnetic vector of expected length. For example, in one particular implementation, to suspend or postpone calibration, ellipse/ellipsoid parameters may be expected to fit or map an ellipse/ellipsoid defined by suitable magnetometer samples obtained at different rotations to a centered circle/sphere with a radius of 1. In other words, if magnitude or length of the currently estimated magnetic vector corresponds to 1, for example, after biases and sensitivities are corrected or removed, it may be determined that current parameters fit well into existing calibration.

Accordingly, for this example, based, at least in part, on suitable magnetometer samples, ellipse/ellipsoid parameters may be estimated, and the determined offset and sensitivity errors may be corrected or removed. It should be noted that, depending on a calibration algorithm or procedure, any suitable or desired techniques may be utilized to correct or remove offset and sensitivity errors from magnetometer samples. For example, in an implementation, the determined offset or sensitivity calibration factors may be selected or stored in memory in some manner. Suitable magnetometer samples may then be corrected using, for example, stored offset or sensitivity factors, just to illustrate one possible implementation. It should also be appreciated that, optionally or alternatively, non-orthogonality errors may also be corrected, for example, prior to estimating a magnitude or length of a magnetic vector with respect to a centered unit circle/sphere, though claimed subject matter is not so limited. Accordingly, if suitable magnetometer samples are available (e.g., via sampling, host application requests, on-demand, etc.), a magnitude or length of a magnetic field vector may be estimated using suitable or desired techniques, such as, for example, one or more techniques mentioned above. If the magnitude or length of the magnetic field vector is suitably or sufficiently close to 1 (e.g., the unit length, etc.), it may be determined or inferred that calibration parameters fit well into existing calibration, and a process to calibrate a magnetometer may be suspended or postponed. Otherwise, a process to calibrate a magnetometer may be initiated or performed. Of course, such a description of a measure of fitness is merely an example, and claimed subject matter is not limited in this regard. For example, in certain implementations, ellipse/ellipsoid parameters may be expected to fit an ellipse/ellipsoid defined by suitable magnetometer samples obtained at different rotations to a circle/sphere with a radius equal to the magnitude of a magnetic field to which a sensor was exposed. In some instances, such a magnitude may be a function of a geographic location, for example, such as the magnitude of the Earth's magnetic field at the point (e.g., latitude, longitude, or altitude) where samples were collected. This magnitude may be determined with reasonable accuracy using, for example, any current geomagnetic references.

As previously mentioned, calculations of an offset, sensitivity, or, in some instances, non-orthogonality factors may be performed, at least in part, if suitable magnetometer samples are available, for example, or may correlate with or correspond to a sampling rate discussed above. In certain implementations, such calculations may be performed, at least in part, when there is a change in a magnetic field in the vicinity of a magnetometer, for example. Such a change may be attributable to, for example, turning a backlight in a display of a mobile device on or off, turning a camera on or off, turning a vibration setting on or off, open or closing a mobile device, or the like, as was also indicated.

Figure 3:
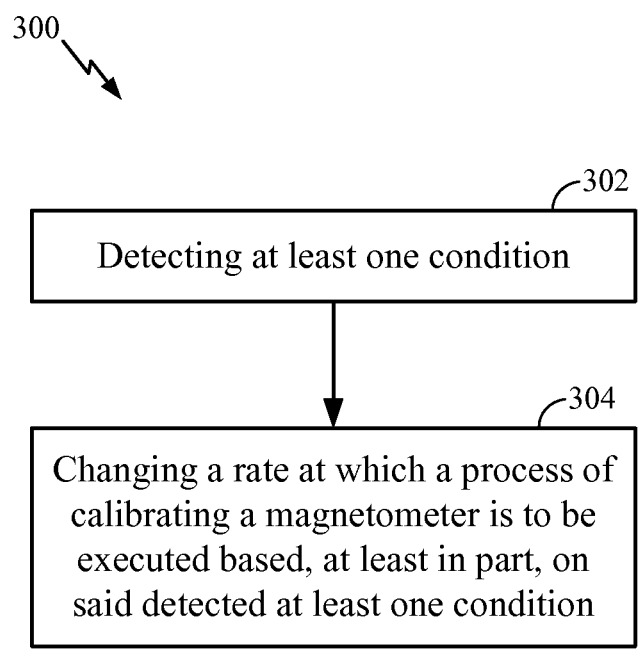
FIG. 3 is a flow diagram illustrating an example process for reducing power consumption or error of a digital compass according to an implementation.

FIG. 3 is a flow diagram illustrating an implementation of an example process 300 that may be implemented, in whole or in part, to facilitate or support one or more operations or techniques for reducing power consumption or error of a digital compass. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 300 may begin at operation 302, for example, with detecting, at a mobile device, at least one condition. For example, such at least one condition may include a detected turn rate or rate of change in orientation of a mobile device. As previously mentioned, a turn rate or rate of change in orientation may be detected or estimated, at least in part, by a gyroscope or, potentially, an accelerometer performing respective measurement activities. Turn rate may also be estimated based, at least in part, on a variation in suitable magnetometer measurements, as was also indicated. Suitable measurements may be captured or obtained by sampling a magnetometer in connection, for example, with a calibration parameter tracking, set selection, or the like. A condition may further include, for example, a measure of fitness of one or more calibration parameters. For example, such a condition may be detected if magnetometer calibration parameters fit well. In some instances, a measure of fitness may be determined based, at least in part, on a turn angle computed via measurements received from one or more associated sensors, for example, a magnetometer, an accelerometer, a gyroscope; or any combination thereof. A turn angle may be computed using any appropriate techniques, such as, for example, by processing ellipse/ellipsoid parameters via capturing suitable points that may be representative of sufficient changes with respect to a rotating magnetic field.

With regard to operation 304, a rate at which a process of calibrating a magnetometer is to be executed may, for example, be changed based, at least in part, on the detected at least one condition. With respect to a detected turn rate, for example, if a mobile device is being turned relatively slowly, magnetometer calibration may be initiated or performed periodically or at a slower rate. On the other hand, if a mobile device is being turned relatively quickly, for example, an associated magnetometer may be calibrated at a relatively higher rate. A magnetometer calibration rate may be determined or derived, at least in part, experimentally and pre-defined, for example, or otherwise dynamically defined, as indicated above. With respect to a measure of fitness of calibration parameters, for example, a process to calibrate a magnetometer may be suspended or otherwise postponed if it is determined that magnetometer calibration parameters fit well. In this context, calibration parameters may fit well if, for example, such parameters map an ellipse/ellipsoid defined by suitable magnetometer samples obtained at different orientations or rotations of the sensor to a centered unit circle/sphere, respectively.

Figure 4:
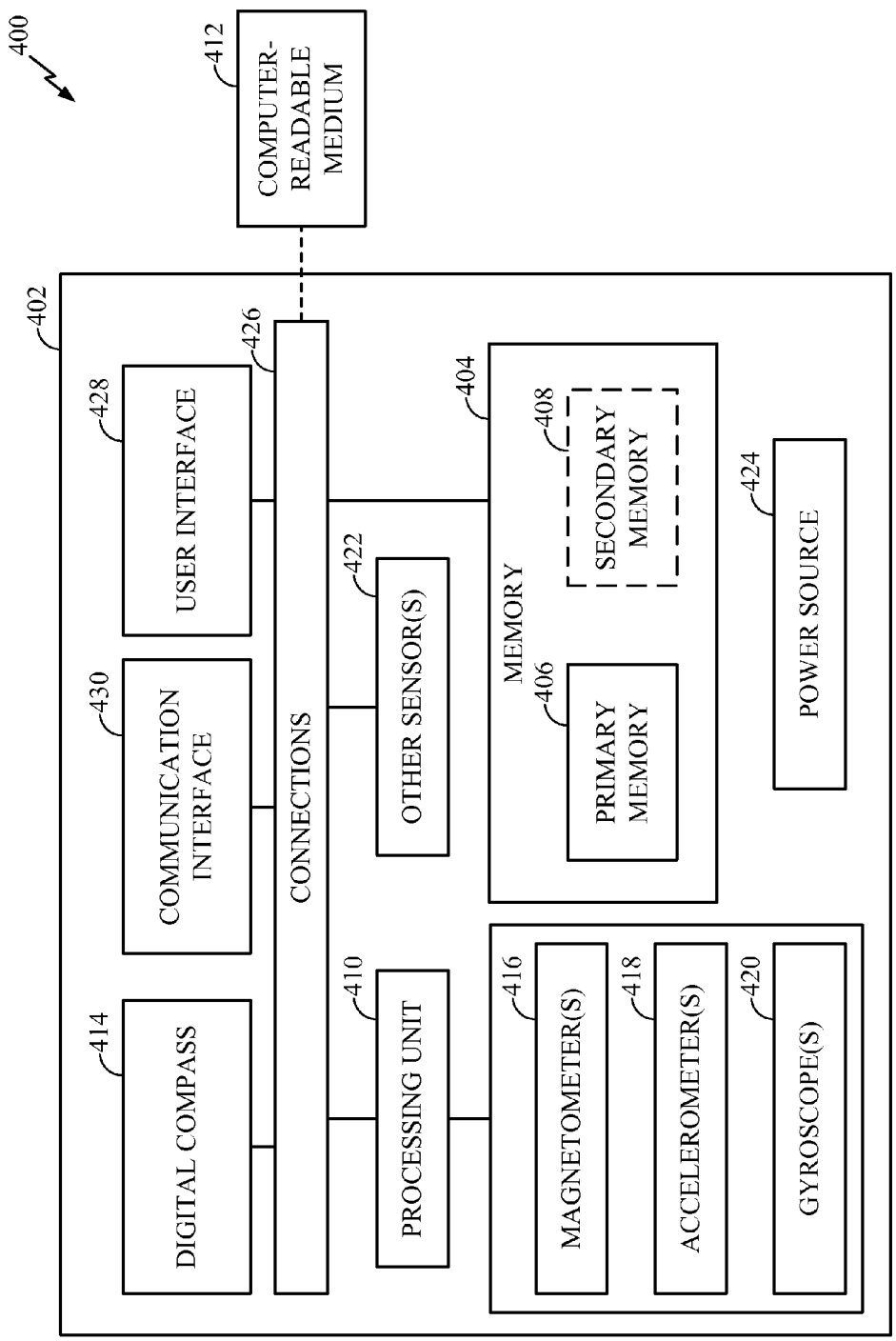
FIG. 4 is a schematic diagram illustrating an example computing environment associated with a mobile device according to an implementation.

FIG. 4 is a schematic diagram illustrating an implementation of an example computing environment 400 that may include one or more networks or devices capable of partially or substantially implementing or supporting one or more processes for reducing power consumption or error of a digital compass. It should be appreciated that all or part of various devices or networks shown in computing environment 400, processes, or methods, as described herein, may be implemented using various hardware, firmware, or any combination thereof along with software.

Computing environment 400 may include, for example, a mobile device 402, which may be communicatively coupled to any number of other devices, mobile or otherwise, via a suitable communications network, such as a cellular telephone network, the Internet, mobile ad-hoc network, wireless sensor network, or the like. In an implementation, mobile device 402 may be representative of any electronic device, appliance, or machine that may be capable of exchanging information over any suitable communications network. For example, mobile device 402 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 402 may take the form of one or more integrated circuits, circuit boards, or the like that may be operatively enabled for use in another device. Although not shown, optionally or alternatively, there may be additional devices, mobile or otherwise, communicatively coupled to mobile device 402 to facilitate or otherwise support one or more processes associated with computing environment 400. Thus, unless stated otherwise, to simplify discussion, various functionalities, elements, components, etc. are described below with reference to mobile device 402 may also be applicable to other devices not shown so as to support one or more processes associated with example computing environment 400.

Computing environment 400 may include, for example, various computing or communication resources capable of providing position or location information with regard to a mobile device 402 based, at least in part, on one or more wireless signals associated with a positioning system, location-based service, or the like. Although not shown, in certain example implementations, mobile device 402 may include, for example, a location-aware or tracking unit capable of acquiring or providing all or part of orientation, position information (e.g., via trilateration, heat map signature matching, etc.), etc. Such information may be provided in support of one or more processes in response to user instructions, which may be stored in memory 404, for example, along with other suitable or desired information, such as offset, sensitivity, or non-orthogonality calibration factors, expected length of a magnetic field vector, or the like.

Memory 404 may represent any suitable or desired information storage medium. For example, memory 404 may include a primary memory 406 and a secondary memory 408. Primary memory 406 may include, for example, a random access memory, read only memory, etc. While illustrated in this example as being separate from a processing unit(s) 410, it should be appreciated that all or part of primary memory 406 may be provided within or otherwise co-located/coupled with processing unit(s) 410. Secondary memory 408 may include, for example, the same or similar type of memory as primary memory or one or more information storage devices or systems, such as, for example, a disk drive, an optical disc drive, a tape drive, a solid state memory drive, etc. In certain implementations, secondary memory 408 may be operatively receptive of, or otherwise enabled to be coupled to, a computer-readable medium 412.

It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Computer-readable medium 412 may include, for example, any medium that can store or provide access to information, code or instructions (e.g., an article of manufacture, etc.) for one or more devices associated with computing environment 400. For example, computer-readable medium 412 may be provided or accessed by processing unit 410. As such, in certain example implementations, the methods or apparatuses may take the form, in whole or part, of a computer-readable medium that may include computer-implementable instructions stored thereon, which, if executed by at least one processing unit or other like circuitry, may enable processing unit(s) 410 or the other like circuitry to perform all or portions of a location determination processes, sensor-based or sensor-supported measurements (e.g., acceleration, deceleration, orientation, tilt, rotation, direction or strength of a magnetic field, etc.) or any like processes. In certain example implementations, processing unit(s) 410 may be capable of performing or supporting other functions, such as communications, gaming, or the like.

Processing unit(s) 410 may be implemented in hardware or a combination of hardware and software. Processing unit(s) 410 may be representative of one or more circuits capable of performing at least a portion of information computing technique or process. By way of example but not limitation, processing unit 410 may include one or more processors, controllers, microprocessors, microcontrollers, application specific integrated circuits, digital signal processors, programmable logic devices, field programmable gate arrays, or the like, or any combination thereof.

Mobile device 402 may include various components or circuitry, such as, for example, a digital compass 414, magnetometer 416, accelerometer 418, gyroscope 420, or various other sensor(s) 422 to facilitate or otherwise support one or more processes associated with computing environment 400. For example, other sensor(s) 422 may provide analog or digital signals to processing unit 410. Although not shown, it should be noted that mobile device 402 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 402 may also include a memory or information buffer to collect suitable or desired information, such as, for example, magnetometer or accelerometer measurement information. Mobile device 402 may also include a power source 424, for example, to provide power to some or all of the components or circuitry. Power source 424 may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 402.

Mobile device 402 may include one or more connections 426 (e.g., buses, lines, conductors, optic fibers, etc.) to operatively couple various circuits together, and a user interface 428 (e.g., display, touch screen, keypad, buttons, knobs, microphone, speaker, trackball, data port, etc.) to receive user input, facilitate or support sensor-related signal measurements, or provide information to a user. Mobile device 402 may further include a communication interface 430 (e.g., wireless transmitter or receiver, modem, antenna, etc.) to allow for communication with one or more other devices or systems over one or more suitable communications networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   receiving one or more measurement signals at a digital compass of a mobile device from one or more sensors of the mobile device;
   determining a motion state of the mobile device in response to the received one or more measurement signals;
   storing magnetometer samples obtained from a magnetometer in a buffer;
   initiating a process, performed by the mobile device, for calibrating the magnetometer based, at least in part, on the motion state indicating motion of the mobile device, wherein the process for calibrating utilizes the magnetometer samples stored in the buffer to perform the calibrating of the magnetometer; and
   suspending the process performed by the mobile device for calibrating the magnetometer, in response to the motion state indicating that said mobile device is in a stationary state, wherein suspending the process performed by the mobile device includes deleting or otherwise ignoring one or more magnetometer samples stored in the buffer corresponding to a time interval immediately before the stationary state.

2. The method of claim 1, and further comprising determining that said mobile device is in said stationary state based, at least in part, on measurements obtained from at least one accelerometer.

3. The method of claim 1, and further comprising determining that said mobile device is in said stationary state based, at least in part, on measurements obtained from at least one gyroscope.

4. The method of claim 1, and further comprising determining that said mobile device is in said stationary state based, at least in part, on measurements obtained from said magnetometer.

5. The method of claim 4, wherein said determining that said mobile device is in said stationary state is based, at least in part, on estimating a variance of said measurements obtained from said magnetometer and comparing the estimated variance with a predefined threshold.

6. The method of claim 1 further comprising suspending the process performed by the mobile device for calibrating the magnetometer until or unless a minimum variation in measurements from the magnetometer is determined.

7. The method of claim 1 further comprising suspending the process performed by the mobile device for calibrating the magnetometer until or unless new sample points of measurements from the magnetometer are different or distinct from previously captured sample points of measurements from the magnetometer.

8. The method of claim 1, further comprising varying the time interval in response to at least one of a host application of the mobile device, a magnetic environment of the mobile device, or a mechanical structure of the mobile device.

9. The method of claim 1, wherein the time interval is in a range of 0.04 to 1 seconds before the stationary state.

10. An apparatus comprising:
a mobile device comprising a magnetometer and at least one processor to:
receive one or more measurement signals at a digital compass of the mobile device from one or more sensors of the mobile device;
determine a motion state of the mobile device in response to the received one or more measurement signals;
store magnetometer samples obtained from the magnetometer in a buffer;
initiate a process, performed by the mobile device, for calibrating the magnetometer based, at least in part, on the motion state indicating motion of the mobile device, wherein the process for calibrating utilizes the magnetometer samples stored in the buffer to perform the calibrating of the magnetometer;
suspend the process to calibrate said magnetometer in response to the motion state indicating that said mobile device is in a stationary state; and
delete or otherwise ignore one or more magnetometer samples stored in the buffer corresponding to a time interval immediately before the stationary state.

11. The apparatus of claim 10, wherein said at least one processor further to:
determine that said mobile device is in said stationary state based, at least in part, on measurements obtained from at least one accelerometer.

12. The apparatus of claim 10, wherein said at least one processor further to:
determine that said mobile device is in said stationary state based, at least in part, on measurements obtained from at least one gyroscope.

13. The apparatus of claim 10, wherein said at least one processor further to:
determine that said mobile device is in said stationary state based, at least in part, on measurements obtained from said magnetometer.

14. The apparatus of claim 13, wherein said at least one processor is further to determine that said mobile device is in said stationary state based, at least in part, on an estimated variance of said measurements obtained from said magnetometer compared to a predefined threshold.

15. The apparatus of claim 10, wherein the at least one processor is further configured to suspend the process to calibrate the magnetometer until or unless a minimum variation in measurements from the magnetometer is determined.

16. The apparatus of claim 10, wherein the at least one processor is further configured to suspend the process to calibrate the magnetometer until or unless new sample points of measurements from the magnetometer are different or distinct from previously captured sample points of measurements from the magnetometer.

17. An article comprising:
a non-transitory storage medium having instructions stored thereon executable by a special purpose computing platform to:
receive one or more measurement signals at a digital compass of a mobile device from one or more sensors of the mobile device;
determine a motion state of the mobile device in response to the received one or more measurement signals;
store magnetometer samples obtained from a magnetometer in a buffer;
initiate a process, performed by the mobile device, for calibrating the magnetometer based, at least in part, on the motion state indicating motion of the mobile device, wherein the process for calibrating utilizes the magnetometer samples stored in the buffer to perform the calibrating of the magnetometer;
suspend, at the mobile device, the process to calibrate the magnetometer in response to the motion state indicating that said mobile device is in a stationary state; and
delete or otherwise ignore one or more magnetometer samples stored in the buffer corresponding to a time interval immediately before the stationary state.

18. The article of claim 17, wherein said non-transitory storage medium further includes instructions to:
determine that said mobile device is in said stationary state based, at least in part, on measurements obtained from at least one accelerometer.

19. The article of claim 17, wherein said non-transitory storage medium further includes instructions to:
determine that said mobile device is in said stationary state based, at least in part, on measurements obtained from at least one gyroscope.

* * * * *